(12) United States Patent
Takeshima et al.

(10) Patent No.: US 7,758,840 B2
(45) Date of Patent: Jul. 20, 2010

(54) METHOD FOR PRODUCING COMPOUND

(75) Inventors: Shinichi Takeshima, Nuzamu (JP); Akio Koyama, Yokohama (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 11/918,543

(22) PCT Filed: Apr. 7, 2006

(86) PCT No.: PCT/JP2006/307875

§ 371 (c)(1), (2), (4) Date: Oct. 15, 2007

(87) PCT Pub. No.: WO2006/112373

PCT Pub. Date: Oct. 26, 2006

(65) Prior Publication Data

US 2009/0047205 A1   Feb. 19, 2009

(30) Foreign Application Priority Data

Apr. 18, 2005   (JP) .............................. 2005-120333

(51) Int. Cl.
    *C01B 31/30* (2006.01)
(52) U.S. Cl. ...................... 423/420.2; 502/262; 502/327
(58) Field of Classification Search .................. 502/439, 502/262, 328, 327, 334
    See application file for complete search history.

(56) References Cited

U.S. PATENT DOCUMENTS

| 4,206,186 | A | * | 6/1980 | Holter et al. ................. 423/230 |
| 4,738,947 | A |   | 4/1988 | Wan et al. |
| 5,242,674 | A |   | 9/1993 | Bruno et al. |
| 5,254,797 | A |   | 10/1993 | Imoto et al. |
| 5,753,581 | A | * | 5/1998 | Beckmeyer et al. ......... 502/304 |
| 6,083,467 | A |   | 7/2000 | Takeshima et al. |
| 6,276,132 | B1 | * | 8/2001 | Kanesaka et al. ............. 60/286 |

(Continued)

FOREIGN PATENT DOCUMENTS

EP    0 562 516 A1    3/1993

(Continued)

OTHER PUBLICATIONS

Masui T. et al., "Characterization and Catalytic Properties of $CeO_2$-$ZrO_2$ Ultrafine Particles Prepared by the Microemulsion Method," 1998, Journal of Alloys and Compounds, vol. 269, pp. 116-122.

(Continued)

*Primary Examiner*—Timothy C Vanoy
*Assistant Examiner*—Richard M Rump
(74) *Attorney, Agent, or Firm*—Oliff & Berridge, PLC

(57) ABSTRACT

A method for producing a compound, in which carrier particles are made to adsorb and carry carried fine particles having a diameter smaller than that of the carrier particles. The method is characterized by comprising: a first step of charging the carrier particles or their precursors to a potential inverse to that of the carried fine particles or their precursors to adsorb the carrier particles or their precursors; and a second step of synthesizing the carried fine particles hardly soluble or their precursors, and causing the carrier particles or their precursors immediately after or during the synthesization to adsorb the hardly soluble carried fine particles or their precursors.

11 Claims, 2 Drawing Sheets

U.S. PATENT DOCUMENTS

| | | | |
|---|---|---|---|
| 6,753,351 B2 * | 6/2004 | Clark et al. | 518/700 |
| 7,294,604 B2 * | 11/2007 | Dath et al. | 502/250 |
| 2003/0109588 A1 | 6/2003 | Schmidt et al. | |
| 2004/0086432 A1 | 5/2004 | LaBarge et al. | |
| 2004/0087440 A1 | 5/2004 | Kuno | |
| 2004/0171483 A1 | 9/2004 | Takeshima | |
| 2004/0234439 A1 * | 11/2004 | Takeshima et al. | 423/263 |
| 2005/0014000 A1 | 1/2005 | Bringley et al. | |

FOREIGN PATENT DOCUMENTS

| | | |
|---|---|---|
| EP | 1 415 956 A2 | 5/2004 |
| EP | 1452 483 A1 | 9/2004 |
| EP | 1 479 651 A1 | 11/2004 |
| JP | A 05-261287 | 10/1993 |
| JP | A 07-246343 | 9/1995 |
| JP | A 08-017942 | 1/1996 |
| JP | A 2000-197822 | 7/2000 |
| WO | WO 02/094716 A1 | 11/2002 |

OTHER PUBLICATIONS

U.S. Appl. No. 10/786,046, filed Feb. 26, 2004 in the name of Shinichi Takeshima.

U.S. Appl. No. 11/542,206, filed Oct. 4, 2006 in the name of Shinichi Takeshima.

U.S. Appl. No. 11/631,174, filed Dec. 29, 2006 in the name of Shinichi Takeshima et al.

New U.S. Patent Application, filed Oct. 15, 2007 in the name of Shinichi Takeshima et al.

Masui T. et al., "Characterization and Catalytic Properties of $CeO_2$-$ZrO_2$ Ultrafine Particles Prepared by the Microemulsion Method," 1998, Journal of Alloys and Compounds, vol. 269, pp. 116-122.

U.S. Appl. No. 10/786,046, filed Feb. 26, 2004 in the name of Shinichi Takeshima.

* cited by examiner

Method of Example

Method of Comparison

METHOD FOR PRODUCING COMPOUND

TECHNICAL FIELD

This invention relates to a method for producing a compound, in which predetermined carrier particles of an oxide or compound oxide are made to carry fine particles having a diameter smaller than that of the carrier particles, as exemplified by a method which can be adopted in case a catalyst is produced by carrying a NOx occluding material.

BACKGROUND ART

As one example of the compound of this kind, there is known an exhaust purifying catalyst, in which fine particles having a NOx occluding function or fine particles of a precious metal or the like having an oxidizing catalyst function. A method for producing that exhaust purifying catalyst by carrying the fine particles on a porous carrier is described in Japanese Patent Laid-Open No. 05-261287. This method can be called the water-adsorption carriage method. In this method, a solution, which is prepared by dissolving a salt of a metal such as an alkali metal or an alkali earth metal to become carried fine particles is dissolved in water, is absorbed by a carrier and is dried. The salt, which has deposited as the water evaporates, is sintered into the oxide and is fixed on the carrier.

As this carrier, there has been usually employed a porous substance having a number of pores for increasing its surface area. The aforementioned solution having the aforementioned salt dissolved is absorbed to penetrate by the porous substance so that the salt is widely dispersed. In this case, the drying phenomena due to the water evaporation occur on the surface of the carrier, and the capillary pressure to occur at the open end portions of the pores is high. Therefore, the solution having the salt dissolved therein is moved, while being dried, to the surface side by the capillary pressure. As a result, the salt concentration rises on the surface side of the carrier, and the water evaporates in this state. Therefore, the particle diameter of the salt having deposited becomes larger on the surface side of the carrier.

In case the exhaust gas purifying catalyst containing the NOx occluding material is produced, for example, the particle size of the NOx occluding material is enlarged if the aforementioned water-adsorption carriage method is adopted using the NOx occluding material as the carried fine particles. As a result, the sulfur poisoning (i.e., S poisoning) of the NOx occluding material in the catalyst obtained is not only easy to proceed but also hardly recoverable. In the exhaust gas purifying catalyst of this kind, moreover, the concentration of the catalytically active substance such as a precious metal is set higher on the surface side of the coating layer and lower on the lower layer side. During the carrying procedure of the NOx occluding material, however, the concentration of the NOx occluding material becomes gradually higher on the surface side of the carrier. As a result, the catalytically active substance such as the precious metal is covered with the NOx occluding material, and it is highly possible that the degree of exposure of the catalytically active substance such as the precious metal becomes lower.

Here in the water-absorption carriage method, the carriage is partially dissolved in the procedure while the salt of the aforementioned NOx occluding material is being dried. As a result, it is also possible that the heat-resistance of the carrier drops. Thus in the water-absorption carriage method of the prior art, the particle diameter of the carried fine particles easily become larger, or the heat-resistance of the carrier easily drops. In case the exhaust gas purifying catalyst containing the NOx occluding material is to be produced, it is also possible that the NOx purifying performance or the oxidation/reduction performance as the catalyst drops.

On the other hand, it is also possible to prepare the carried fine particles in a solid without employing the solution having the metal salt of the carried fine particles dissolved therein. In this case, the carried fine particles are protected with a stabilizing agent of a high polymer or a surface active agent so that the carried fine particles may be suppressed in their mutual agglomeration. As a result, the carried fine particles become expensive. In the presence of the stabilizing agent, moreover, the carried fine particles are hard to carry on the carriage. Even with the use of the stabilizing agent, moreover, the carried fine particles are hard to keep the stable state for a long time, and their management may be troublesome.

DISCLOSURE OF THE INVENTION

This invention has been conceived noting the technical problems thus far described, and has an object to provide a compound producing method, which can disperse fine particles homogeneously and without increasing their particle diameter and can carry them on a carrier, when the fine particles are to be adsorbed by and carried on the carrier.

In order to achieve the aforementioned object, this invention provides a method, which is characterized in that carried fine particles or their precursors are synthesized in the state where the surface potential of carrier particles or their precursors is adjusted in advance, and in that the carried fine particles or their precursors are adsorbed immediately after or during the synthesization by the carrier particles by making use of an electric attraction. According to this invention, more specifically, there is provided a method for producing a compound, in which carrier particles are made to adsorb and carry carried fine particles having a diameter smaller than that of said carrier particles, characterized by comprising: a first step of charging said carrier particles or their precursors to a potential inverse to that of said carried fine particles or their precursors to adsorb said carrier particles or their precursors; and a second step of synthesizing said carried fine particles hardly soluble or their precursors, and causing said carrier particles or their precursors immediately after or during the synthesization to adsorb said hardly soluble carried fine particles or their precursors.

In the aforementioned invention, moreover, said carrier particles are made of a compound oxide, and said carried fine particles are made of NOx occluding material.

In the aforementioned invention, moreover, the particle component of said NOx occluding material is an element component of at least one kind of alkali metals or alkali earth metals, and said hardly soluble fine particles or their precursors are any of carbonate, oxalate or sulfate, or barium nitrate.

In any of the aforementioned inventions, moreover, at said first step, said carried fine particles or their precursors have a plus surface potential whereas said carrier particles or their precursors have a minus surface potential.

In the aforementioned invention, moreover, the pH of the atmosphere, in which said carried fine particles or their precursors are adsorbed by said carrier particles or their precursors, is set at such a pH value that said hardly soluble fine particles or their precursors may have a surface potential of +5 to +40 mV.

In any of the inventions, moreover, the first step of charging said carrier particles or their precursors to the potential inverse to that of said carried fine particles or their precursors to adsorb said carrier particles or their precursors is to cause the surface of said carrier particles or their precursors to adsorb an organic acid in advance.

In the aforementioned invention, moreover, said organic acid is any of pyromellitic acid, maleic acid and phthalic acid.

According to this invention, the carried fine particles are synthesized in the solid state, and the carrier particles or their precursors are then inversely charged. Therefore, the carried fine particles in the hardly soluble solid are adsorbed immediately after or during the synthesization onto the carrier particles or their precursors by the electric attraction. The carried fine particles are carried, even after dried or sintered, in the solid state and are adsorbed by the electric attraction. At the drying step, therefore, the carried fine particles are prevented or suppressed from moving or becoming locally denser so that the homogeneously dispersed compound can be obtained with any increase in the particle diameter of the carried fine particles.

According to this invention, moreover, the NOx occluding material is not made coarse. If this invention is adopted as a method for producing an occluding reduction type exhaust gas purifying catalyst, the NOx occluding material can be suppressed in the sulfur poisoning and promoted in the recovery from the sulfur poisoning thereby to produce an exhaust gas purifying catalyst excellent in the occluding reduction performance.

According to this invention, moreover, the carrier particles or their precursors and the carried fine particles or their precursors are adjusted to the inverse potentials. If the pH values are so adjusted that the surface potential may take the aforementioned voltage, the potential difference can be made sufficiently large for causing the carrier particles to adsorb the carried fine particles firmly and reliably.

In this invention, moreover, even if the charging characteristics of the carrier particles or their precursors and the charging characteristics of the carried fine particles or their precursors are similar to each other, the surface potential of the carrier particles or their precursors is set to the potential inverse to the carried fine particles or their precursors, before the carried fine particles or their precursors are synthesized. Therefore, the carried fine particles or their precursors can be reliably adsorbed by the electric attraction on the carrier particles or their precursors.

BEST MODE FOR CARRYING OUT THE INVENTION

This invention relates to a method for producing a compound, in which carrier particles are caused to carry finer particles. The compound is exemplified by a compound oxide which can be used as a catalyst for purifying a burned exhaust gas, and the oxide to act as a carrier is a heat-resisting or refractory porous substance having pores of a predetermined diameter. It is preferred that the pores are mesopores having diameters belonging to the so-called mesorange of about 10 to 100 nm.

As the oxide to become the carrier, specifically, there can be adopted an oxide such as zirconia, alumina or titania, or a compound oxide such as silica-alumina, lanthanum-yttrium-zirconium, yttria-zirconia, lathanum-zirconium, cerium-zirconium or lanthanum-silica. The carrier particles of that oxide are exemplified by a porous structure, which is obtained by causing secondary particles of an agglomeration of primary particles produced by a hydrolysis to further agglomerate.

On the other hand, the carried fine particles to be carried by the aforementioned carrier are finer particles than the aforementioned carrier particles, as exemplified by the so-called ultrafine particles of several nm. Specifically, these ultrafine particles are the fine particles of oxides of an alkaline metal, an alkaline earth metal or a rare earth metal functioning as a NOx adsorbent, or the fine particles of a precious metal such as platinum or rhodium having an oxidizing-reducing catalyst function.

In the method of this invention, carrier particles or their precursors are synthesized in advance, and their surface potential is adjusted to the potential inverse to that of the carried fine particles or their precursors to be carried. Therefore, the method for synthesizing the carrier particles is described at first. The method for producing the porous structure may be exemplified by ones known in the prior art. Of these methods, the microemulsion method utilizing a microemulsion is preferred, in which micelles (or inverse micelles) having an aqueous phase inside are dispersed in an organic solvent (i.e., oil). This is specifically explained in the following. At first, the primary particles of a predetermined oxide or its precursor are produced and are made to agglomerate to produce the secondary particles, and these secondary particles are made to agglomerate to each other. However, the agglomeration of the secondary particles is suppressed till the secondary particles grow to a size of some extent. In order to suppress the fusion (or coalescence) of the inverse micelles till the secondary particles grow, there can be adopted a method for enlarging the spacing between the inverse micelles by increasing the quantity of oil, a method for suppressing the fusion (or coalescence) of the inverse micelles with electric repulsions by increasing the density of the cations (excepting hydrogen ions) in the inverse micelles, and so on.

Figure 1:
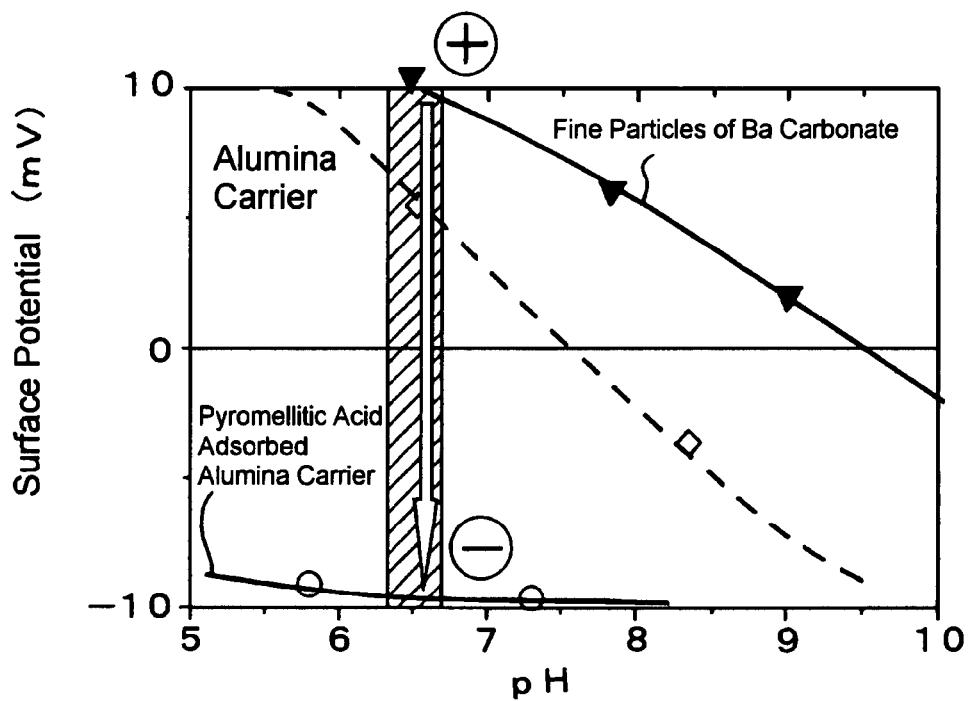
FIG. 1 is a diagram schematically showing situations of the charging characteristics of alumina and barium carbonate and the situations of potential adjustment by pyromellitic acid.

Next, the adjustment of the surface potential is described in the following. The carrier particles thus synthesized and the aforementioned carried fine particles to be carried by the carrier particles have intrinsic charging characteristics. For example, the charging characteristics are shown in FIG. 1 on alumina, which can be made into the carrier particles, and barium carbonate which can be made into the precursor of the carried fine particles. Both of these exhibit the charging characteristics, in which the surface potential (or the zeta-potential) gradually change from positive to negative as a pH value rises. In an atmosphere lower than pH=7 suitable for the synthesization of barium carbonate, both alumina and barium carbonate are charged to the plus polarity to take similar potentials. In this state, the alumina and the barium carbonate to adsorb each other repulse each other electrically. In this case, the surface potential of the carrier particles already synthesized are adjusted in this invention to become inverse to the potential of the carried fine particles or their precursors.

Specifically, an acid or base is adsorbed by the carrier particles or their precursors thereby to invert the substantial surface potential. In order to make the plus surface potential of the carrier particles or their precursors inverse to the minus polarity, a predetermined acid is used as a potential adjusting agent. This acid can be exemplified by an organic acid such as pyromellitic acid, maleic acid or phthalic acid. In order to make the minus surface potential of the carrier particles or their precursors inverse to the plus polarity, on the contrary, a predetermined base is used as the potential adjusting agent. This base can be exemplified by benzalkonium chloride or cholin chloride.

After the surface potential of the carrier particles or their precursors was adjusted, as described above, the carried fine particles are synthesized. During or immediately after the synthesization, the carried fine particles or their precursors are adsorbed by the aforementioned carrier particles or their precursors. The carried fine particles can be synthesized by hydrolyzing or neutralizing a compound of an element of at least one kind of alkali metal, alkaline earth metal or rare earth metal and by depositing the compound as a hardly soluble solid. Specifically, the carried fine particles are synthesized as carbonates, oxalates or sulfates of those elements. Here, the element barium is exclusively synthesized as barium nitrate.

The carrier particles, the surface potential of which has been adjusted by the aforementioned potential adjusting agent or their precursors, and the carried fine particles or their precursors are mixed in a predetermined solution. In this case, their individual surfaces potentials accord to the pH value of the solution. In this invention, however, the pH value of the solution is so adjusted that the surface potentials may become inverse to each other. Preferably, the pH value of the solution is so adjusted that the surface potential of the hardly soluble carried fine particles or their precursors may be about +5 to +40 mV. In this state, therefore, the surface potential of the carrier particles adjusted with the aforementioned potential adjusting agent or their precursors takes the minus polarity.

Thus, the potential of the carrier particles or their precursors and the potential of the carried fine particles or their precursors are inverse to each other so that the carried fine particles, i.e., the ultrafine particles or their precursors are attracted by the electric attraction onto the surfaces of the carrier particles or their precursors. In this case, the carried fine particles or their precursors are so adsorbed as to bury the portions charged to the minus polarity in the surfaces of the carrier particles or their precursors. As a result, the carried fine particles can be densely adsorbed to establish the homogeneous phase. The carrier particles or their precursors having adsorbed the carried fine particles thus prepared or their precursors are sintered after the known rinsing and drying steps into the compound such as the compound oxide particles.

As a result, the carried fine particles or their precursors are synthesized in the solid state and are adsorbed by the electric attraction onto the carrier particles or their precursors. Even if, therefore, the moisture is caused by the capillary pressure during the subsequent drying procedure to migrate to the surface sides of the carrier particles or their precursors, the carried fine particles or their precursors are blocked or suppressed in their movements. As a result, the dispersion degree or the particle size of the carried fine particles does not largely change before and after the drying or sintering operation, so that the carried fine particles can be dispersed widely and homogeneously to produce a compound having small particle diameter.

The method of this invention can be applied to the method for producing the catalyst carrying the NOx occluding material, as has been described hereinbefore. If, in this application, the NOx occluding material or its precursor is adsorbed and carried by the carrier particles such as alumina or their precursors, the particle diameter of the NOx occluding material in the catalyst obtained can be made smaller than that of the method of the prior art. Therefore, it is possible to produce an exhaust cleaning catalyst which can suppress the sulfur poisoning and can regenerate the sulfur poisoning easily.

Example and Comparison, which have been done to confirm the effects of this invention, are presented in the following.

EXAMPLE

Figure 2:
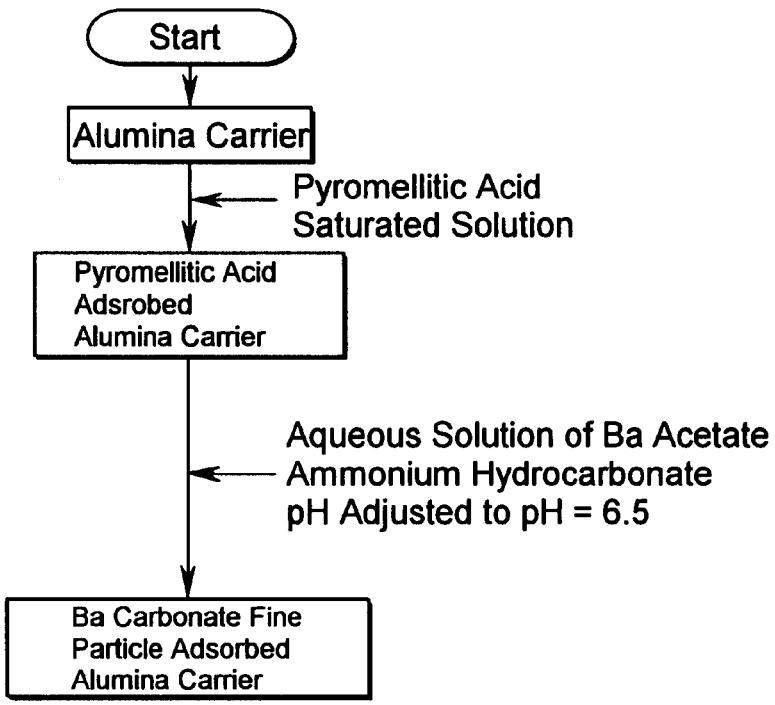
FIG. 2 is a flow chart for explaining an operation procedure in an embodiment of this invention.

The operating procedure is shown in the flow chart of FIG. 2. The catalyst produced was prepared by coating a monolith substrate in advance by a known suitable method with a carrier composed of alumina, titania and zirconia, and by carrying a precious metal such as platinum or rhodium on the monolith substrate. This catalyst was dipped in a saturated solution of pyromellitic acid to adsorb the pyromellitic acid. Next, 300 ml (milliliters) of molar solution of ammonium hydrocarbonate was added to and agitated with the liquid prepared by dissolving barium acetate of 0.4 mols into about 4 l of distilled water. At this time, the pH value dropped to 6.5 so that fine particles of barium carbonate were produced.

The fine particles of barium carbonate were adsorbed by the catalyst by extracting the aforementioned catalyst from the pyromellitic acid solution and blowing off the pyromellitic acid having excessively stuck, and by dipping the catalyst as in the precious metal impregnation case known in the prior art, into the aforementioned liquid containing the barium carbonate produced. This adsorption took about 30 minutes.

The catalyst composition obtained was Pt: 2 g/L (L: one liter of the catalyst, as in the following), Rh: 0.5 g/L, Ba/K=0.2/1 mol/L, and the carrier: a mixture of alumina, titania and zirconia.

[Comparison]

Figure 3:
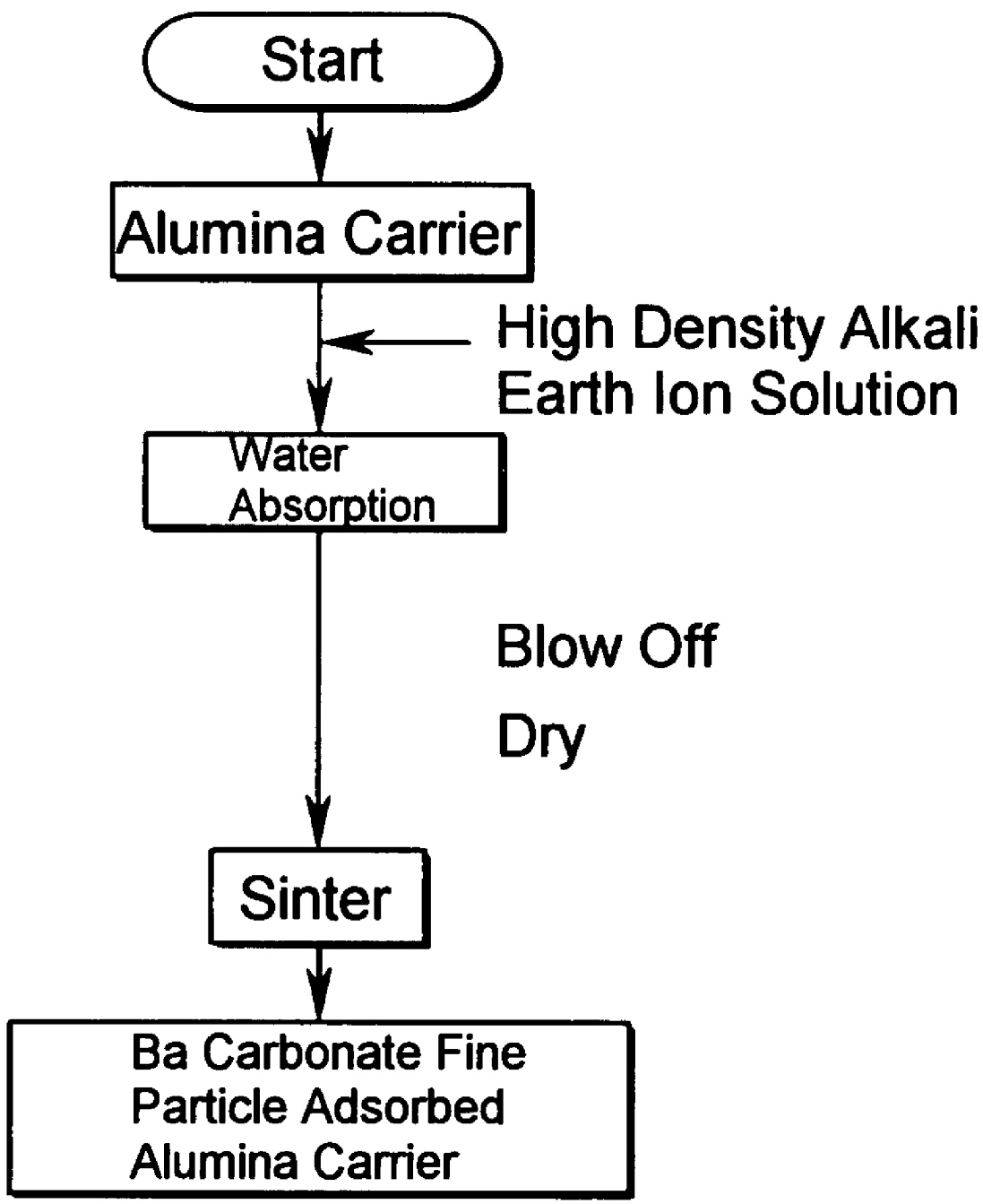
FIG. 3 is a flow chart for explaining an operation procedure in Comparison.

The carriage was made by the water absorption carriage method, as schematically shown in the flow chart of FIG. 3. At first, there was prepared a suitable catalyst carrier known in the prior art. On the other hand, a solution of highly dense alkaline earth element ions was prepared. This solution was absorbed by the pores of the aforementioned carrier. After this, the alkaline earth element salt was carried on the aforementioned carrier by blowing off the solution having excessively stuck and by drying and then sintering the carrier.

In an example of the case using barium acetate, 5.17 g of barium acetate was dissolved in 4 ls of distilled water. After this, a catalyst, which had been prepared by coating 2 ls of a monolith substrate a catalyst carrier composed of alumina, titania and zirconia by the existing method so that it carried a precious metal such as platinum and rhodium, was dipped in the aforementioned liquid thereby to fill the pores of the catalyst with the liquid. Immediately after this, the catalyst was pulled up from the solution and blown off the excessively stuck solution and was dried with a hot wind of 120° C. The catalyst composition obtained was similar to that of the aforementioned Example.

[Evaluation]

On the catalyst obtained from Example and the catalyst obtained from Comparison, evaluations were made as to the poisoning by SOx (as called the SOX) and the regeneration from the poisoning. An exhaust gas at a lean burning time and an exhaust gas at a rich burning time (at a stoichiometric or smaller air/fuel ratio) were fed as the exhaust gas of an internal combustion engine. The test run at a special velocity of SV=50,000 $h^{-1}$, in which a lean run was continued for 1 minute and followed by a rich run of 30 seconds, was continued for a predetermined time period. The exhaust gas at the learn run had the composition of NOx: 250 ppm, $O_2$: 6%, $H_2O$: 8%, $CO_2$: 10%, and the remainder being mainly a $N_2$ gas. The exhaust gas at the rich run had the composition of $O_2$: 0%, CO: 6,000 ppm, and the remainder being identical to that of the learn run.

The sulfur poisoning condition was: the temperature at 250 to 550° C.; and the quantity of sulfur to pass at 6 g (6 g/L) to 1 litter of catalyst. The sulfur reproducing condition was: the temperature of 650° C.; and the flow of the exhaust gas of an air/fuel ration (A/F) of about "14" for 10 minutes. The results obtained are enumerated in Table 1.

TABLE 1

NOx Purification Percentages
at Repetitions of SOx Poisoning Regeneration

| Temp. ° C. | Example | | Comparison | |
| --- | --- | --- | --- | --- |
| | New Products | Repetitions of SOx Poisoning Regeneration | New Products | Repetitions of SOx Poisoning Regeneration |
| 550 | 17.2 | 16.1 | 88.5 | 11.5 |
| 500 | 43.3 | 42.8 | 95.1 | 23.7 |
| 450 | 88.9 | 89.1 | 97.9 | 44.2 |
| 400 | 99.5 | 99.3 | 99.6 | 87.3 |

Table 1 enumerates the NOx purification percentages at the repetitions of SOx poisoning regeneration. It has been confirmed that the catalysts obtained by Example of the invention had no large difference between the new products and the repetitions of SOx poisoning regeneration, in the NOx purification percentages within the individual temperature ranges, that the NOx occluded material hardly had the sulfur poisoning, or that the regeneration from the sulfur poisoning was easy. This seems to come from that the barium or the NOx occluded material was fine, and that the precious metal such as platinum or rhodium was accordingly not covered by the NOx occluded material but exposed at a large ratio.

On the contrary, it has been confirmed that the catalysts obtained by Comparison had its NOx purification percentages lowered after the repetitions of the SOx poisoning regeneration, that this tendency was the more prominent at the higher temperature so that the purification percentages were lowered to about one eighth at 550° C., and that the catalyst was easily poisoned with sulfur and was difficult to regenerate. This seems to come from that the carried fine particles or the NOx occluding material were diametrically enlarged.

The invention claimed is:

1. A method for producing an exhaust gas purifying catalyst, in which carrier particles of a support are made to adsorb and carry substantially water insoluble carried particles having a diameter smaller than that of said carrier particles, the method comprising:
    a first step of charging said carrier particles or their precursors, before synthesizing said carried particles or their precursors, to a potential inverse to that of said carried particles or their precursors to adsorb said carrier particles or their precursors; and
    a second step of synthesizing said carried particles or their precursors,
    wherein said carried particles or their precursors are synthesized substantially simultaneously with being adsorbed to said carrier particles or their precursors, and
    wherein the first step is caused by absorbing an organic acid on the surface of said carrier particles or their precursors in advance.

2. The method for producing an exhaust gas purifying catalyst as set forth in claim 1, wherein:
    said carrier particles are made of a compound oxide; and
    said carried particles are made of NOx occluding material.

3. The method for producing an exhaust gas purifying catalyst as set forth in claim 2, wherein:
    the particle component of said NOx occluding material is an element component of at least one kind of alkali metals or alkali earth metals, and
    said carried particles or their precursors are any of carbonate, oxalate or sulfate.

4. The method for producing an exhaust gas purifying catalyst as set forth in claim 1, wherein:
    at said first step, said carried particles or their precursors have a plus surface potential whereas said carrier particles or their precursors have a minus surface potential.

5. The method for producing an exhaust gas purifying catalyst as set forth in claim 3, wherein:
    the pH of the atmosphere, in which said carried particles or their precursors are adsorbed by said carrier particles or their precursors, is set at such a pH value that said carried particles or their precursors may have a surface potential of +5 to +40 mV.

6. The method for producing an exhaust gas purifying catalyst as set forth in claim 1, wherein:
    said organic acid is any of pyromellitic acid, maleic acid and phthalic acid.

7. The method for producing an exhaust gas purifying catalyst as set forth in claim 2, wherein:
    at said first step, said carried particles or their precursors have a plus surface potential whereas said carrier particles or their precursors have a minus surface potential.

8. The method for producing an exhaust gas purifying catalyst as set forth in claim 3, wherein:
    at said first step, said carried particles or their precursors have a plus surface potential whereas said carrier particles or their precursors have a minus surface potential.

9. The method for producing an exhaust gas purifying catalyst as set forth in claim 4, wherein:
    a pH of an atmosphere, in which said carried particles or their precursors are adsorbed by said carrier particles or their precursors, is set at such a pH value that said carried particles or their precursors may have a surface potential of +5 to +40 mV.

10. The method for producing an exhaust gas purifying catalyst as set forth in claim 7, wherein:
    a pH of an atmosphere, in which said carried particles or their precursors are adsorbed by said carrier particles or their precursors, is set at such a pH value that said carried particles or their precursors may have a surface potential of +5 to +40 mV.

11. The method for producing an exhaust gas purifying catalyst as set forth in claim 8, wherein:
    a pH of an atmosphere, in which said carried particles or their precursors are adsorbed by said carrier particles or their precursors, is set at such a pH value that said carried particles or their precursors may have a surface potential of +5 to +40 mV.

* * * * *